(12) United States Patent
Busser

(10) Patent No.: US 11,630,884 B2
(45) Date of Patent: Apr. 18, 2023

(54) METHOD FOR MANAGING ACCESS TO A DEVICE, AND ACCESS SYSTEM

(71) Applicant: Siemens Aktiengesellschaft, Munich (DE)

(72) Inventor: Jens-Uwe Busser, Neubiberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 157 days.

(21) Appl. No.: 16/647,921

(22) PCT Filed: Sep. 13, 2018

(86) PCT No.: PCT/EP2018/074699
§ 371 (c)(1),
(2) Date: Mar. 17, 2020

(87) PCT Pub. No.: WO2019/053104
PCT Pub. Date: Mar. 21, 2019

(65) Prior Publication Data
US 2020/0265125 A1 Aug. 20, 2020

(30) Foreign Application Priority Data

Sep. 18, 2017 (EP) ..................... 17191584

(51) Int. Cl.
*G06F 21/31* (2013.01)
*G06F 21/46* (2013.01)
*H04L 9/40* (2022.01)

(52) U.S. Cl.
CPC .............. *G06F 21/31* (2013.01); *G06F 21/46* (2013.01); *H04L 63/083* (2013.01)

(58) Field of Classification Search
CPC ......... G06F 21/31; G06F 21/46; H04L 63/083
See application file for complete search history.

(56) References Cited

U.S. PATENT DOCUMENTS 8,281,372 B1 * 10/2012 Vidal ................... G06Q 20/405
709/206
9,536,067 B1 * 1/2017 Lee .......................... G06F 21/31
(Continued)

FOREIGN PATENT DOCUMENTS

| CN | 104834840 A | 8/2015 |
| CN | 106611110 A | 5/2017 |
| GB | 2531710 A | 5/2016 |
| WO | 2017071498 A1 | 5/2017 |

OTHER PUBLICATIONS

Jakobsson, M. and Liu, D., 2011. Bootstrapping mobile PINs using passwords. (Year: 2011).*

(Continued)

*Primary Examiner* — James R Turchen
(74) *Attorney, Agent, or Firm* — Schmeiser, Olsen & Watts LLP

(57) ABSTRACT

A method for managing access to a device, which has a first and a second input interface, each for inputting a character string, including the steps of: generating a password having a prescribed minimum number of characters and having a measure of complexity; generating a subpassword on the basis of the generated password and a prescribed mapping specification, wherein the subpassword has a lower measure of complexity than the password; and enabling access to the device if a character string input via the first input interface corresponds to the password or a character string input via the second input interface corresponds to the subpassword. The method and a corresponding access system for a device permit simple handling of the password management by the respective user is also provided.

13 Claims, 2 Drawing Sheets

(56) References Cited

U.S. PATENT DOCUMENTS

| | | | |
|---|---|---|---|
| 9,722,996 B1* | 8/2017 | Kolman | H04L 63/083 |
| 2009/0217389 A1 | 8/2009 | Estroff et al. | |
| 2010/0275257 A1 | 10/2010 | Nishida | |
| 2013/0166895 A1* | 6/2013 | Cui | G06F 9/4401 |
| | | | 713/2 |
| 2013/0326611 A1* | 12/2013 | Gargi | G06F 21/31 |
| | | | 726/16 |
| 2015/0121467 A1 | 4/2015 | Yun et al. | |
| 2016/0050209 A1* | 2/2016 | Govande | H04L 63/101 |
| | | | 726/7 |
| 2017/0109508 A1* | 4/2017 | Semoto | H04L 63/083 |
| 2017/0331819 A1* | 11/2017 | Quirke | H04W 12/041 |
| 2018/0255053 A1* | 9/2018 | Bhabbur | H04L 9/3228 |
| 2019/0080060 A1* | 3/2019 | Lee | G06Q 20/308 |

OTHER PUBLICATIONS

Naito, H., Kajita, S., Hirano, Y. and Mase, K., 2007, January. Multiple-tiered security hierarchy for web applications using central authentication and authorization service. In 2007 International Symposium on Applications and the Internet Workshops (pp. 27-27). IEEE. (Year: 2007).*

Aspinall, D. and Just, M., 2013, April. "Give me letters 2, 3 and 6!": Partial password implementations and attacks. In International Conference on Financial Cryptography and Data Security (pp. 126-143). Springer, Berlin, Heidelberg. (Year: 2013).*

* cited by examiner

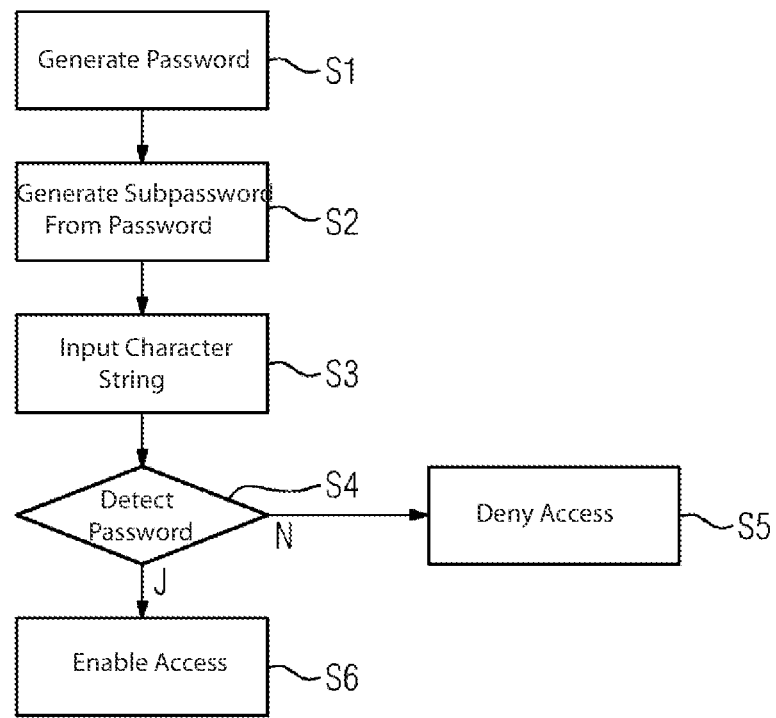
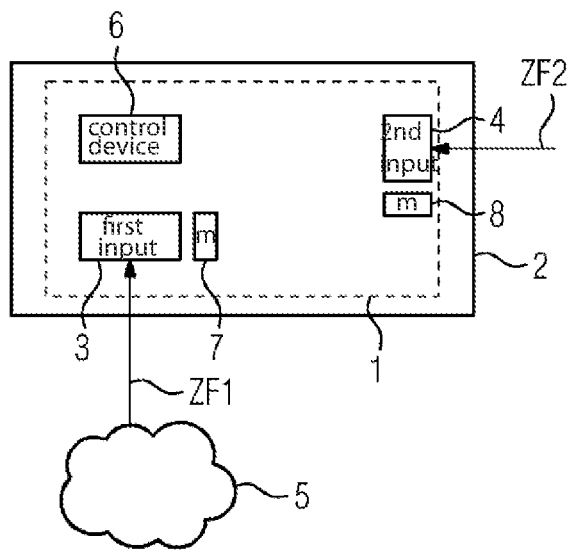

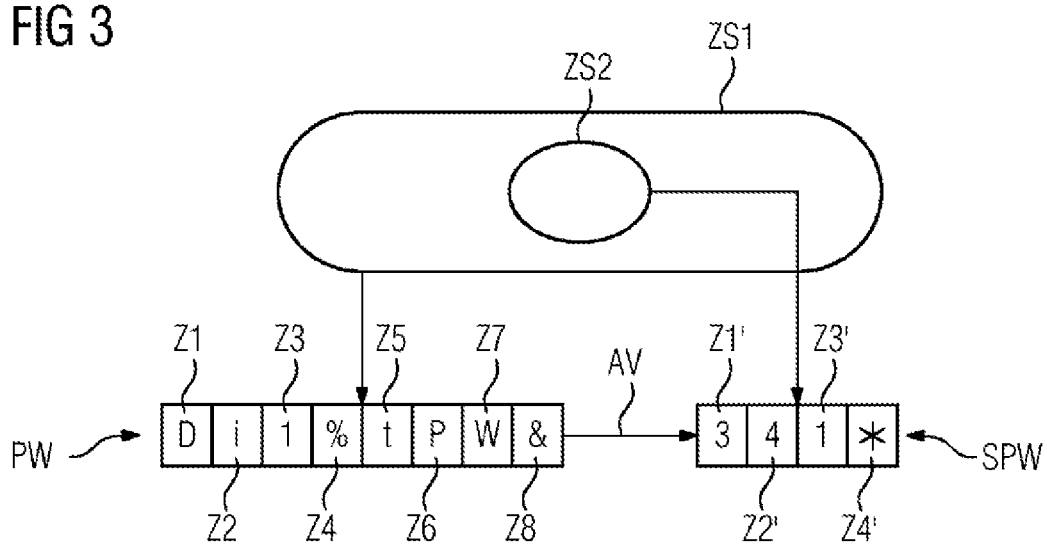

METHOD FOR MANAGING ACCESS TO A DEVICE, AND ACCESS SYSTEM

CROSS-REFERENCE TO RELATED APPLICATIONS

This application claims priority to PCT Application No. PCT/EP2018/074699, having a filing date of Sep. 13, 2018, based on EP 17191584.6, having a filing date of Sep. 18, 2017, the entire contents of both are hereby incorporated by reference.

FIELD OF TECHNOLOGY

The following relates to a method for managing access to a device, and to an access system. The access management is effected for example in the style of a method for generating passwords and checking entered passwords. An access system is assigned to or integrated in a device, for example.

BACKGROUND

In the past, mechanical access to devices has been protected by mechanical locks. The lock can be understood as an interface that is opened using a key and thus allows access to the apparatus behind it. In the case of conventional mechanical keys and locks, the key consisted of a physical item that needed to be protected. As a result, mechanical locks have also been equipped as keys by means of number combinations, for example in the case of safes.

Devices today, which are frequently computer-based and also accessible remotely, for example via a network, besides direct physical access, also have interfaces that allow or prevent access. By way of example, it is known practice to grant access by means of a personal password or a personalized identification number (PIN) or to deny access in the event of incorrect input. In order to ensure adequate security, specific complexity demands are made on the passwords used. By way of example, passwords should have a specific minimum character length or the space for possible characters should be as large as possible, which increases the entropy.

Users who are allocated such a password frequently have the problem of secure storage. The longer and more complex the password, the more difficult it is for human users to remember and correctly enter. This is particularly disadvantageous if for example a local interface necessitates direct entry of the password via an input terminal or a keyboard. When a device is accessed via a network, for example via a network interface, on the other hand, secure storage of a complex password by the user using a secured memory device is conceivable.

In the past, different independent passwords were thus used for different interfaces to a respective device. Storing or remembering many different passwords is frequently felt to be inconvenient, however.

SUMMARY

Accordingly, a method for managing access to a device is proposed, wherein the device has a first and a second input interface, each for inputting a character string. The method includes the steps of:
generating a password having a prescribed minimum number of characters;
generating a subpassword on the basis of the generated password and a prescribed mapping specification, wherein the subpassword includes characters from a smaller character set and/or includes a smaller number of characters than the password;
enabling access to the device if a character string input via the first input interface corresponds to the password or a character string input via the second input interface corresponds to the subpassword.

It is in particular possible for the password to have a prescribed measure of complexity and for the subpassword to have a smaller measure of complexity than the password.

Further, an access system for a device is proposed, which system includes:
a first input interface for inputting a character string for remote access to the device;
a second input interface for inputting a character string for local access to the device;
a control device, coupled to the first and second input interfaces, that is configured to enable or block access to the device.

In this case, access is enabled if a character string input via the first input interface corresponds to a prescribed password or a character string input via the second input interface corresponds to a prescribed subpassword. The subpassword is dependent on the password and a prescribed mapping specification. The subpassword has in particular a smaller measure of complexity than the password.

In embodiments, the access system is configured to perform a method as described above or below. The control device is designed for this purpose as appropriate, for example.

The proposed access management and the access system involve facilitated handling of the password and subpassword for the operator or user. By way of example, particularly long passwords can be remembered and correctly entered only with difficulty. Also, the method and the system allow the use of simple input devices, for example having only a few keys and a small character set, into which complex long passwords can be entered only in a long-winded manner. The use of the subpassword, which is in particular explicitly deducible from the password, allows facilitated operation to be achieved.

Access to a device is understood to mean in particular allowing the option of use of the device equipped with the access system as intended. A user is therefore permitted access such that, after getting past the access system that grants the applicable clearance, he can control, use, alter, operate or activate the device. If access is denied, on the other hand, the user is not permitted to operate it or the device cannot be operated, or can be operated only with limitations.

It can be stated that the device fundamentally provides specific functions that can be performed, used or activated by a user only if access to the device or to the function of the device is granted. Reference is therefore also made to enabling the function.

In embodiments, the first input interface is configured for remote access, in particular as a network interface, and the second input interface is configured for exclusively local access, in particular in the style of a keyboard interface.

For example, in embodiments, the first input interface can be configured to perform authentication of the operator by means of an authentication service. The authentication service used can be for example a Kerberos service. In this case, the user then requests what is known as a ticket granting ticket (TGT) from a Kerberos authentication server. To authenticate the user, which can be understood as a client device, for example, the password is used. The TGT can then be used by the user to obtain from a ticket granting server a service ticket for the device or specific services provided thereby. This service ticket is then used to allow the enabling or access to the device.

It is furthermore conceivable for the second input interface to be a manual input interface. In the case of this interface, which can be designed in the style of a keyboard having multiple keys, for example, there is in particular the possibility of inputting the subpassword. A manual interface can be understood to mean an input option that requires direct interaction with the user. A manual interface can preclude input of character strings remotely in embodiments. Haptic, acoustic and/or visual human-machine interfaces are conceivable as manual input interface.

In further embodiments, the first input interface has an associated first memory device for storing the password, and the second input interface has an associated second memory device for storing the subpassword. In this case, the first and second input interfaces are arranged so as to be physically separate from one another. It is further possible for the password and subpassword to be stored independently of one another, in particular in encrypted or hashed form.

The password, which can also be understood as a network password, can alternatively be stored in the device or in a memory device associated with the first input interface in plain text. According to the mapping specification, it is then possible for the subpassword to be generated therefrom.

When the password and the subpassword are stored separately from one another, an attacker who wishes to gain knowledge of the passwords or of the subpassword without authorization is impeded. Should an attacker have recognized the subpassword for the local input interface, for example, it is thus still not possible to directly reconstruct the network password because information is lost when the password is mapped onto the subpassword.

In embodiments, the first input interface and the second input interface allow access to the same function of the device for a respective pair comprising a password and the associated subpassword. It is also conceivable for access via the first input interface using the password to result in a different, in particular an extended, scope of functions of the device being enabled in comparison with access to the device via the second input interface and the subpassword.

In embodiments, the password consists of characters of a first character set and the subpassword consists of characters of a second character set. The first character set includes more characters than the second character set in this case.

The effect achieved by this is that the entropy of a random password is greater than the entropy of a subpassword.

In embodiments of the mapping specification, multiple characters of the first character set are mapped onto one character of the second character set. This facilitates use of the subpassword, since the second input interface can be designed less extravagantly, for example with fewer characters to be recognized, than the first input interface.

In one variant of the mapping specification, the mapping specification takes into consideration only a selection of characters of the password. In particular, the mapping specification involves at least one character at the beginning of the password being taken into consideration. For an operator, it is more intuitive to begin by inputting a password or the associated subpassword with the same character.

In embodiments, the characters of the subpassword are a selection of characters of the password. In a further variant, the password contains upper- and lowercase letters as characters, and the mapping specification maps upper- and lowercase letters of one same letter onto one character of the subpassword. This further improves handling.

It is further conceivable for the mapping specification to map upper- and lowercase letters of one same letter onto one character of the subpassword of the letter.

Overall, the proposed access management allows improved handling and facilitated access in particular via the second input interface, which can also be referred to as local interface.

The first interface is in particular an input interface that can handle a more complex password. By way of example, this is a network interface that can be addressed by a client that is present externally to the device.

It is firstly possible to use a complex secure password to perform a network logon, and to take a, by way of example, simple rule in the style of the mapping specification as a basis for performing a simple short password for a direct local logon. The user therefore has two different authentication methods available using a single password to be stored or remembered.

In embodiments, the second input interface requires a physical access as local interface. The interface is therefore differently or better protected than the first input interface, embodied as a network interface, in particular. Automation of the access to the second input interface by an attacker is hampered thereby.

The respective unit or device, for example the input interface or the control unit, can be implemented in hardware and/or else in software. In the case of a hardware implementation, the respective unit can be in the form of an apparatus or in the form of part of an apparatus, for example in the form of a computer or in the form of a microprocessor. In the case of a software implementation, the respective unit can be in the form of a computer program product (non-transitory computer readable storage medium having instructions, which when executed by a processor, perform actions) in the form of a function, in the form of a routine, in the form of part of a program code or in the form of an executable object.

Furthermore, a computer program product is proposed that prompts the performance of the method as explained above on a program-controlled device equipped with a corresponding access system.

A computer program product, such as e.g. a computer program means, can be provided or supplied for example as a storage medium, such as e.g. a memory card, USB stick, CD-ROM, DVD, or else in the form of a downloadable file from a server in a network. This can be effected for example in a wireless communication network by means of the transmission of an appropriate file having the computer program product or the computer program means.

The embodiments and features described for the proposed access system apply to the proposed method for managing access accordingly.

Further possible implementations of the embodiments also encompass not explicitly mentioned combinations of features or embodiments described above or below with regard to the exemplary embodiments. A person skilled in the art will also add individual aspects as improvements or supplementations to the respective basic form of the embodiment.

BRIEF DESCRIPTION

Some of the embodiments will be described in detail, with reference to the following figures, wherein like designations denote like members; wherein:

FIG. 1 depicts a flowchart for a method for managing access according to one exemplary embodiment;

FIG. 2 depicts a schematic block diagram for an access system according to one exemplary embodiment;

FIG. 3 depicts a schematic depiction to explain password generation according to one exemplary embodiment; and FIG. 4 depicts an exemplary embodiment of a local interface.

In the figures, elements that are the same or that have the same function have been provided with the same reference signs, unless indicated otherwise.

DETAILED DESCRIPTION

Exemplary embodiments and variants of a method for managing access to a device using a corresponding access system are described on the basis of FIGS. 1 and 2. FIG. 1 shows a flowchart for a method for managing access that can be performed using the access system depicted as a schematic block diagram in FIG. 2.

A step that precedes the first step S1 can be preceded by the provision of an access system 1. By way of example, a device 2 as indicated in FIG. 2 is equipped with an access system 1. The device 2 can be understood to mean a general technical system, for example. It is also conceivable for it to be a physical device, such as a machine or an appliance. The device 2 can in particular also be a computer or computer system coupled to a network.

The access system 1 includes a first input interface 3, designed as a network interface, and a second input interface 4, configured as a local interface. A local interface is understood to mean that the spatial and physical presence of a user or of an additional device is required in order to address the local interface 4. The access system 1 further includes a control device 6, which can be program-controlled and implements the performance of a method as described in FIG. 1 and below. There is furthermore provision for memory devices 7, 8 that are each associated with the interfaces 3, 4. FIG. 2 furthermore symbolically shows a network 5, for example an Internet link, via which the network interface 3 is available.

In a first step S1, a password PW, also referred to as network password below, is generated. The password PW meets prescribed password demands in respect of its complexity. This can involve a measure of complexity having been prescribed for the password PW. The measure of complexity used can be the number of different characters within the password PW, for example. Other measures of complexity are also conceivable, for example geared to the entropy of a random password from the space of possible passwords.

FIG. 3 depicts a password PW comprising eight characters Z1-Z8 in exemplary fashion. The password Di1%tPW& follows a stipulation of at least eight characters, for example, from which at least one upper- and one lowercase letter, one digit and one special character are supposed to be present. The characters Z1-Z8 come from a stock of characters or character set ZS1. The character set ZS1 can comprise 72 characters, for example, that is to say 26 upper- and 26 lowercase letters and also ten digits and ten special characters. The entropy of a random password PW having eight characters and one such character set ZS1 then has approximately 49 bits. This value is obtained from the calculation $\log_{10}(72^8)/\log_{10}(2) \approx 49$.

This password PW allows access to the device 2 via the network interface 3. This is because if a character string ZF1 corresponding to the password PW is input, the network interface 3 or the corresponding control device 6 enables access to one or more functions of the device 2.

In a second method step S2, a subpassword SPW is generated from the password PW by applying a mapping specification AV. This is likewise explained in FIG. 3. A mapping specification AV depicted as an arrow maps the eight characters Z1-Z8 of the password PW onto just four characters Z1'-Z4' of the subpassword SPW. The subpassword SPW is formed from characters that correspond to a character set ZS2. The character set ZS2 has fewer characters in this case than the character set ZS1 for the password PW. In the example depicted in FIG. 3, the mapping specification AV maps the eight-character password PW onto a four-character subpassword or local password SPW. The entropy that results for the local password SPW is less than 14 bits in this case; it has a smaller measure of complexity.

The mapping specification AV provides for the character Z1=D to be mapped onto Z1'=3, for example. The second character Z2=i is mapped onto the second character Z2'=4. The third character Z3=1 is mapped onto the third character Z3'=1, and the fourth character Z4=% is mapped onto the fourth character Z4'=*. In the example of a mapping specification AV in FIG. 3, only the first four starting characters Z1-Z4 of the password PW are used to generate the subpassword SPW. This has the advantage that a user who knows the network password PW can easily deduce the local password SPW by himself and needs to enter fewer characters when logging onto the local interface.

Using the local password SPW, the user can gain access to the device 2 via the local interface 4 of the access system 1 by entering the local password as character string ZF2. In the third method step referred to as S3 (see FIG. 1), a respective character string ZF1, ZF2 is therefore input or entered onto the network interface 3 or the local interface 4. The control device 6 then performs a comparison (step S4) of the respective input character string ZF1 with the password or ZF2 with the subpassword. If the result of the comparison S4 is that the respective entered character string ZF1 or ZF2 does not correspond to the password PW or subpassword SPW, access to the device 2 is denied, see step S5. The access system 1 acts as a gatekeeper or lock, as it were.

The password PW and the subpassword SPW can be protected against unauthorized reading by using various conventional measures, for example by restricting read authorization for the memory area, by means of encryption using a key that is present in the device, or by means of storage in hashed form, for example with additional data (salted hash). Since the subpassword SPW can easily be reconstructed from the hash of the subpassword SPW by an attacker on account of its low entropy, and, if the SPW is known, the password PW can also easily be reconstructed from the hash of the password PW, storage in independent, separate memories 7, 8 may be advantageous.

In order to make entry of the local password or subpassword SPW simple, the local interface is designed as a manual input interface in the style of a keyboard, as depicted in FIG. 4, for example. FIG. 4 shows a possible embodiment of a local or second interface 41. For this, FIG. 4 shows a keyboard having twelve keys, only one being denoted by the reference sign 42. The mapping specification AV indicated in FIG. 3 is implemented by means of the internal assignment of respective characters to the keyboard 41. The keyboard has twelve keys, denoted by 1-9, *, 0 and #. The keys with the digits 2-9 are each assigned three or four letters, as indicated in FIG. 4; the * key is assigned all special characters, the # key can complete the entry. For example the local interface 4 provides a user with the opportunity to deduce the key sequence 341* from the first four characters of the password PW that is known to him, namely di1%, by applying the mapping specification AV that is known to him.

Other mapping specifications are conceivable besides the mapping specification AV depicted in FIG. 4 that involves only some characters of the network password being used to deduce the local password.

In another variant, only a prescribed number of characters at the beginning of the network password PW are used for mapping the network password PW onto the local password SPW.

It is also conceivable for upper- and lowercase letters, for example d and D, to be mapped onto the same character of the subpassword SPW. It is also possible for multiple letters to be mapped as characters onto just one character.

In a further variant, as indicated in FIG. 4 too, multiple letters are mapped onto one digit each time. In particular the local interface designed as interface 41 is provided with labeling that maps the many characters of the character set ZS1 onto the respective character of the character set ZS2 for the local password SPW in the style of a mapping table. When implementing the mapping specification AV and designing the interface 41, it is possible to take into consideration that certain characters have a higher probability of being used in passwords than other characters.

If, following entry of the respective character string ZF1 or ZF2, the control device 6 then detects in step S4 that the correct password PW or subpassword SPW has been entered, access to the device 2 is enabled in step S6. This means that the user can use the device 2 as intended. By way of example, this also allows physical access to a door lock, for example. Access to a computer locally via the respective keyboard is also conceivable. The device can be an automation device. The use of a corresponding access system 1 in automation environments or industrial networks is conceivable.

Although the present invention has been described on the basis of exemplary embodiments, it is modifiable in numerous diverse ways. In particular, mapping specifications other than those cited in the exemplary embodiments can be used. The local interface can in particular also be a touchscreen installed locally on a machine or another human-machine interface requiring physical operation. Access to the respective device can be effected fully, or, depending on the chosen input interface, limited functions or functionalities can be enabled, even if the respectively correct password or subpassword is entered. In particular, it is also possible for different passwords or subpasswords to be used for different operators or authorization levels in parallel. Overall, the proposed method facilitates the use of password-protected devices.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for managing access to a device that has a first input interface and a second input interface, each for inputting a character string, the method comprising:

generating a password having a prescribed minimum number of characters and having a measure of complexity;

generating a subpassword on a basis of the password and a prescribed mapping specification, wherein the subpassword has a smaller measure of complexity than the password;

enabling access to the device if a character string input via the first input interface corresponds to the password or a character string input via the second input interface corresponds to the subpassword;

wherein the first input interface is for remote access and the second input interface is for exclusively local access;

wherein the first input interface has a first associated memory device stored on the device for storing the password, and the second input interface has a second associated memory device stored on the device for storing the subpassword such that the password and the subpassword are stored independently of each other on separate memories both residing on the device;

wherein the password consists of characters of a first character set and the subpassword consists of characters of a second character set, further wherein the first character set comprises more characters than the second character set;

wherein the prescribed mapping specification maps multiple characters of the first character set onto one character of the second character set, and the second input interface is provided with labelling that maps the multiple characters of the first character set onto a respective character of the second character set in a style of a mapping table;

wherein the characters of the subpassword are a selection of characters of the password.

2. The method as claimed in claim 1, wherein the prescribed mapping specification takes into consideration only a selection of characters of the password, the selection being at least one character at a beginning of the password.

3. The method as claimed in claim 1, wherein the password contains upper and lowercase letters as characters, further wherein the prescribed mapping specification maps upper and lowercase letters of one same letter onto a character of the subpassword.

4. The method as claimed in claim 3, wherein the prescribed mapping specification maps upper- and lowercase letters of one same letter onto the corresponding letter of the subpassword.

5. The method as claimed in claim 1, wherein the first input interface is a network interface and the second input interface is a keyboard interface.

6. The method as claimed in claim 1, wherein the first input interface and the second input interface allow access to one same function of the device for a respective pair comprising the password and the associated subpassword.

7. The method as claimed in claim 1, wherein the password and the subpassword are stored independently of one another in encrypted or hashed form.

8. The method as claimed in claim 1, wherein a function of the device is accessed for a purpose of changing the password exclusively via the first input interface.

9. The method as claimed in claim 1, wherein the first associated memory device stores the password in hashed form, and the second associated memory device stores the subpassword in hashed form.

10. An access system for a device, the system comprising:
a first input interface for inputting a character string for remote access to the device;
a second input interface for inputting a character string for local access to the device;
a control device, coupled to the first input interface and the second input interface, that is configured to enable or block access to the device;
wherein access is enabled if a character string input via the first input interface corresponds to a prescribed password or a character string input via the second input interface corresponds to a prescribed subpassword,
wherein the subpassword is dependent on the password and a prescribed mapping specification; and
wherein the subpassword has a smaller measure of complexity than the prescribed password;
wherein the first input interface has a first associated memory device stored on the device for storing the password, and the second input interface has a second associated memory device stored on the device for storing the subpassword such that the password and the subpassword are stored independently of each other on separate memories both residing on the device;
wherein the password consists of characters of a first character set and the subpassword consists of characters of a second character set, further wherein the first character set comprises more characters than the second character set;
wherein the prescribed mapping specification maps multiple characters of the first character set onto one character of the second character set, and the second input interface is provided with labelling that maps the multiple characters of the first character set onto a respective character of the second character set in a style of a mapping table;
wherein the characters of the subpassword are a selection of characters of the password.

11. The access system as claimed in claim 10, wherein the access system is configured to perform a method for managing access to the device.

12. The access system as claimed in claim 10, wherein the first input interface and the second input interface are arranged so as to be physically separate from one another.

13. The access system as claimed in claim 10, wherein the first input interface is configured to perform the authentication using an authentication service, and the second input interface is a manual interface.

* * * * *